(12) United States Patent
Tokito

(10) Patent No.: US 12,052,482 B2
(45) Date of Patent: Jul. 30, 2024

(54) CAMERA MODULE

(71) Applicant: SONY SEMICONDUCTOR SOLUTIONS CORPORATION, Kanagawa (JP)

(72) Inventor: Toshihiro Tokito, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 110 days.

(21) Appl. No.: 17/906,325

(22) PCT Filed: Mar. 25, 2021

(86) PCT No.: PCT/JP2021/012573
§ 371 (c)(1),
(2) Date: Sep. 14, 2022

(87) PCT Pub. No.: WO2021/200554
PCT Pub. Date: Oct. 7, 2021

(65) Prior Publication Data
US 2023/0100251 A1   Mar. 30, 2023

(30) Foreign Application Priority Data
Mar. 31, 2020 (JP) .................. 2020-065049

(51) Int. Cl.
*H04N 7/18* (2006.01)
*G03B 17/12* (2021.01)
*H04N 23/51* (2023.01)

(52) U.S. Cl.
CPC ............. *H04N 23/51* (2023.01); *G03B 17/12* (2013.01)

(58) Field of Classification Search
CPC ........... H04N 23/51; H04N 7/18; G03B 17/12
(Continued)

(56) References Cited

U.S. PATENT DOCUMENTS 7,595,943 B2 * 9/2009 Yuan ................ G02B 7/028
  359/820
7,650,067 B2 * 1/2010 Chiang ............. G02B 7/04
  359/825

(Continued)

FOREIGN PATENT DOCUMENTS

JP   2006-327514 A   12/2006
JP      3178274 U    9/2012

(Continued)

OTHER PUBLICATIONS

International Search Report and Written Opinion of PCT Application No. PCT/JP2021/012573, issued on Jun. 15, 2021, 09 pages of ISRWO.

*Primary Examiner* — Trang U Tran
(74) *Attorney, Agent, or Firm* — CHIP LAW GROUP

(57) ABSTRACT

A camera module according to an embodiment of the present technology includes a housing that includes a first case that includes an opening at one of ends of the first case, and a second case that is joined to another of the ends of the first case; a barrel member that is arranged in the housing and includes a barrel that is fitted into the opening in an optical-axis direction; a sensor board that is arranged in the housing and includes an imaging device that faces the barrel; and a support that includes a peripheral wall portion and a control portion, and is arranged between the barrel member and the second case, the peripheral wall portion including a first end and a second end and covering around the imaging device, the first end supporting the barrel member, and the second end being brought into elastic contact with the second case.

10 Claims, 12 Drawing Sheets

(58) Field of Classification Search
USPC .......................................................... 348/148
See application file for complete search history.

(56) References Cited

U.S. PATENT DOCUMENTS

| | | | | |
|---|---|---|---|---|
| 7,652,836 | B2* | 1/2010 | Aoki | ........................ G02B 7/04 |
| | | | | 359/824 |
| 8,265,479 | B2* | 9/2012 | Imai | ...................... H04N 23/57 |
| | | | | 348/373 |
| 8,692,931 | B2* | 4/2014 | Imai | ........................ G02B 7/02 |
| | | | | 348/374 |
| 10,054,757 | B2* | 8/2018 | Knutsson | ................ B60R 11/04 |
| 11,525,669 | B2* | 12/2022 | Lyu | ........................ H04N 23/51 |
| 2012/0050895 | A1* | 3/2012 | Kotanagi | ................. G02B 7/08 |
| | | | | 359/823 |
| 2017/0115463 | A1* | 4/2017 | Osaka | .................... H02K 41/02 |
| 2023/0000325 | A1* | 1/2023 | Motohara | ............ A61B 1/0057 |

FOREIGN PATENT DOCUMENTS

| | | | |
|---|---|---|---|
| JP | 2013-109188 | A | 6/2013 |
| JP | 5413231 | B2 | 2/2014 |
| JP | 2018-173431 | A | 11/2018 |
| JP | 2018-173434 | A | 11/2018 |
| WO | 2019/049537 | A1 | 3/2019 |

* cited by examiner

CAMERA MODULE

CROSS REFERENCE TO RELATED APPLICATIONS

This application is a U.S. National Phase of International Patent Application No. PCT/JP2021/012573 filed on Mar. 25, 2021, which claims priority benefit of Japanese Patent Application No. JP 2020-065049 filed in the Japan Patent Office on Mar. 31, 2020. Each of the above-referenced applications is hereby incorporated herein by reference in its entirety.

TECHNICAL FIELD

The present technology relates to a camera module mounted on, for example, a vehicle.

BACKGROUND ART

A camera system that includes a camera module mounted on a vehicle and is used to perform visual recognition using a monitor apparatus placed near a cockpit has been provided in the past, in order to improve the convenience and the safety for the vehicle. This type of camera module includes a substantially rectangular housing into which, for example, an imaging lens, an imaging device, and an external connector are incorporated, and the housing is built in or attached to, for example, a rear door, a sideview mirror, or a front spoiler of a vehicle body such that the imaging lens faces the outside. Such a camera apparatus makes it possible to capture an image of surroundings of a vehicle that are a blind spot as viewed from a driver, and thus to improve the safety and the convenience.

For example, Patent Literature 1 discloses, as this type of camera module, an apparatus that includes a housing formed by a front case and a rear case being joined to each other; a board that is arranged in the housing and includes an imaging device, a barrel member that is arranged between the imaging device and the front case, and a shield case that surrounds the board, the barrel member being fixed in the housing using a spring force of the shield case.

CITATION LIST

Patent Literature

Patent Literature 1: Japanese Patent No. 5413231

DISCLOSURE OF INVENTION

Technical Problem

In this type of camera module, a barrel of the barrel member is configured to be exposed to the outside through an opening formed in a front surface portion of the front case. Thus, when a large external force acts on the barrel, the shield case may be deformed beyond its elastic limit. This may result in a reduction in the accuracy in the position of the barrel member in the housing, and thus in a significant reduction in the quality of a camera image.

In view of the circumstances described above, it is an object of the present technology to provide a camera module that makes it possible to improve the durability for an external force that acts on the barrel, and thus to prevent a reduction in the image quality.

Solution to Problem

A camera module according to an embodiment of the present technology includes a housing, a barrel member, a sensor board, and a support.

The housing includes a first case that includes an opening at one of ends of the first case, and a second case that is joined to another of the ends of the first case.

The barrel member is arranged in the housing and includes a barrel that is fitted into the opening in an optical-axis direction.

The sensor board is arranged in the housing and includes an imaging device that faces the barrel.

The support includes a peripheral wall portion and a control portion, and is arranged between the barrel member and the second case. The peripheral wall portion includes a first end and a second end and covers around the imaging device, the first end supporting the barrel member, the second end being brought into elastic contact with the second case. The control portion is arranged between the peripheral wall portion and an inner peripheral surface of the first case and controls approach of the barrel member to the second case.

The control portion may be an elastic part that is formed of a portion of the peripheral wall portion and presses the inner peripheral surface of the first case.

The elastic part may be a plate member that extends toward the second case from the peripheral wall portion and may be inclined with respect to the optical-axis direction.

The inner peripheral surface of the first case may include an engagement concave portion that is locally formed at a position, in the inner peripheral surface, that is brought into contact with the elastic part, the engagement concave portion being engaged with an end of the elastic part.

The first case may be made of a synthetic resin material that has absorptive properties with respect to laser light of a specified wavelength, and the second case may be made of a synthetic resin material that has transmissive properties with respect to the laser light.

The first case may further include an elongated protrusion that is provided to the inner peripheral surface of the first case, the elongated protrusion including the engagement concave portion. The elongated protrusion includes a light entrance surface that faces the second case such that there is a gap between the light entrance surface and the second case, the light entrance surface being capable of receiving irradiation of the laser light.

The elongated protrusion may further include a gap portion that is formed between the light entrance surface and a lateral surface portion of the first case.

The control portion may be provided to locations that are included in a plurality of locations in the peripheral wall portion and situated across the sensor board from each other.

The camera module may further include an external connector. The external connector is provided to the second case and electrically connected to the sensor board.

The camera module may be attachable to a vehicle.

MODE(S) FOR CARRYING OUT THE INVENTION

Embodiments according to the present technology will now be described below with reference to the drawings.

Figure 1:
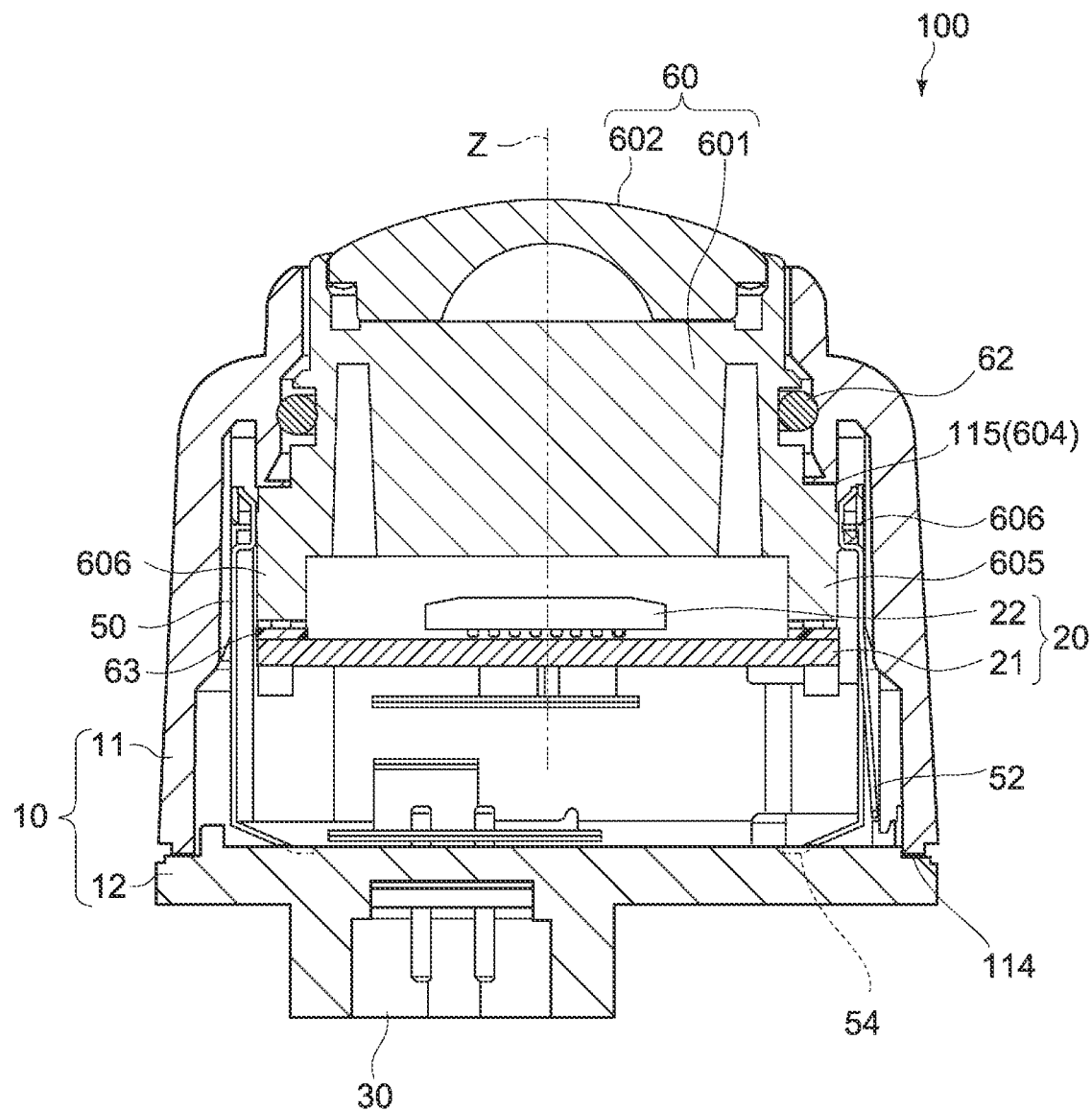
FIG. 1 is a cross-sectional side view illustrating a configuration of a camera module according to an embodiment of the present technology.

FIG. 1 is a cross-sectional side view illustrating a configuration of a camera module 100 according to an embodiment of the present technology. The camera module 100 of the present embodiment is configured as a camera module used by being mounted on a vehicle.

The camera module 100 can be attached to a vehicle. For example, the camera module 100 is arranged outside of a vehicle body (an attachment target) (not illustrated), and captures an image of a region situated ahead of a vehicle, an image of a region situated behind the vehicle, or a region on a lateral side of the vehicle depending on an attachment position. For example, the camera module 100 attached to a front portion (for example, a radiator grill) of a vehicle body captures an image of an environment ahead of the vehicle. Further, the camera module 100 attached to a rear portion (for example, above a license plate) of the vehicle body captures an image of an environment behind the vehicle. Furthermore, the camera module 100 attached to a side portion of the vehicle (for example, an upper portion of a pillar (an A-pillar, a B-pillar, or a pillar (a C-pillar, a D-pillar) situated in a rearmost portion of the vehicle, or a sideview mirror) captures an image of an environment in a lateral direction of the vehicle.

[Overall Configuration of Camera Module]

As illustrated in FIG. 1, the camera module 100 of the present embodiment includes, for example, a housing 10, a sensor board 20, a support 50, and a barrel member 60.

(Housing)

The housing 10 is configured by a front case 11 that is a first case, and a rear case 12 that is a second case being combined in a direction of an optical axis Z. Typically, the front case 11 and the rear case 12 are injection-molded bodies made of a synthetic resin material. The camera module 100 is fixed to a vehicle body through a bracket (not illustrated) that is attached to the rear case 12.

Figure 2:
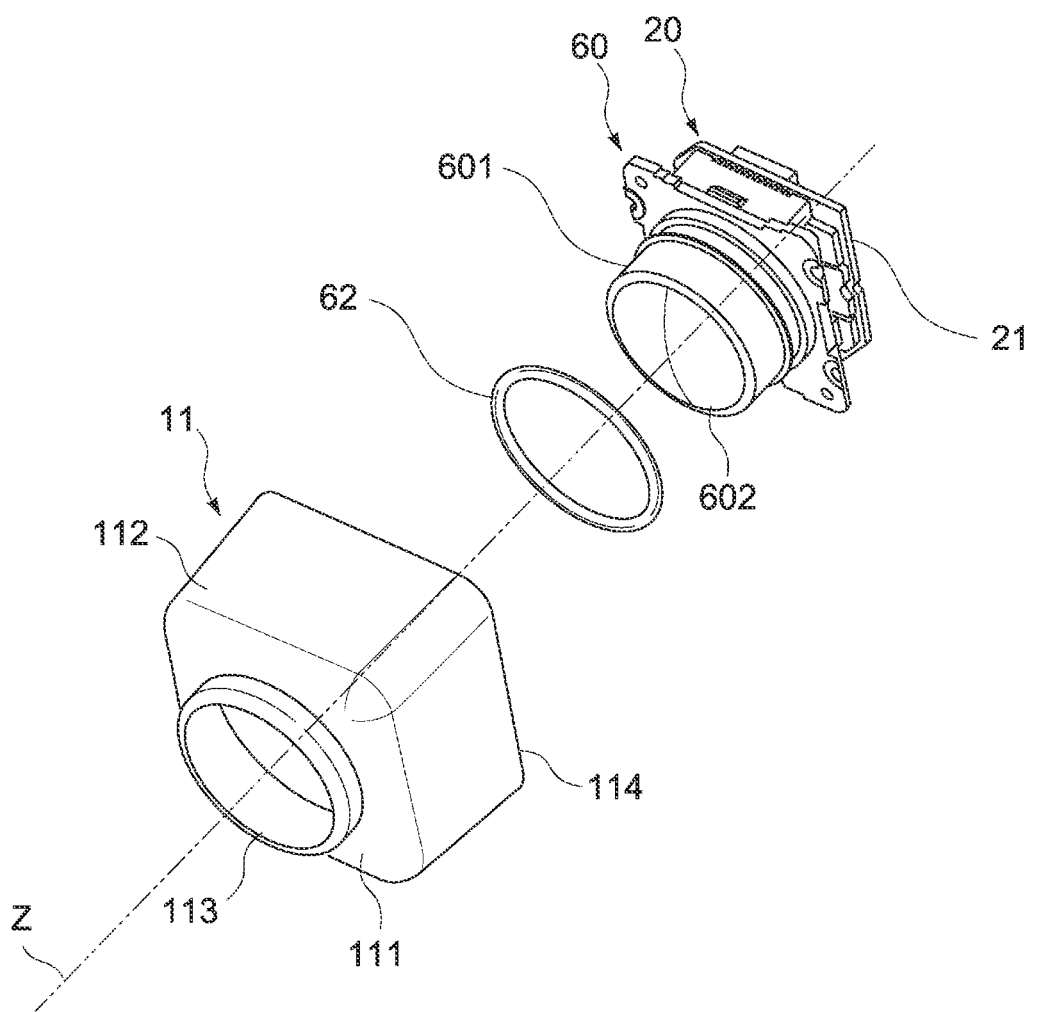
FIG. 2 is an exploded perspective view illustrating a relationship between a first case and a barrel member in the camera module.
Figure 3:
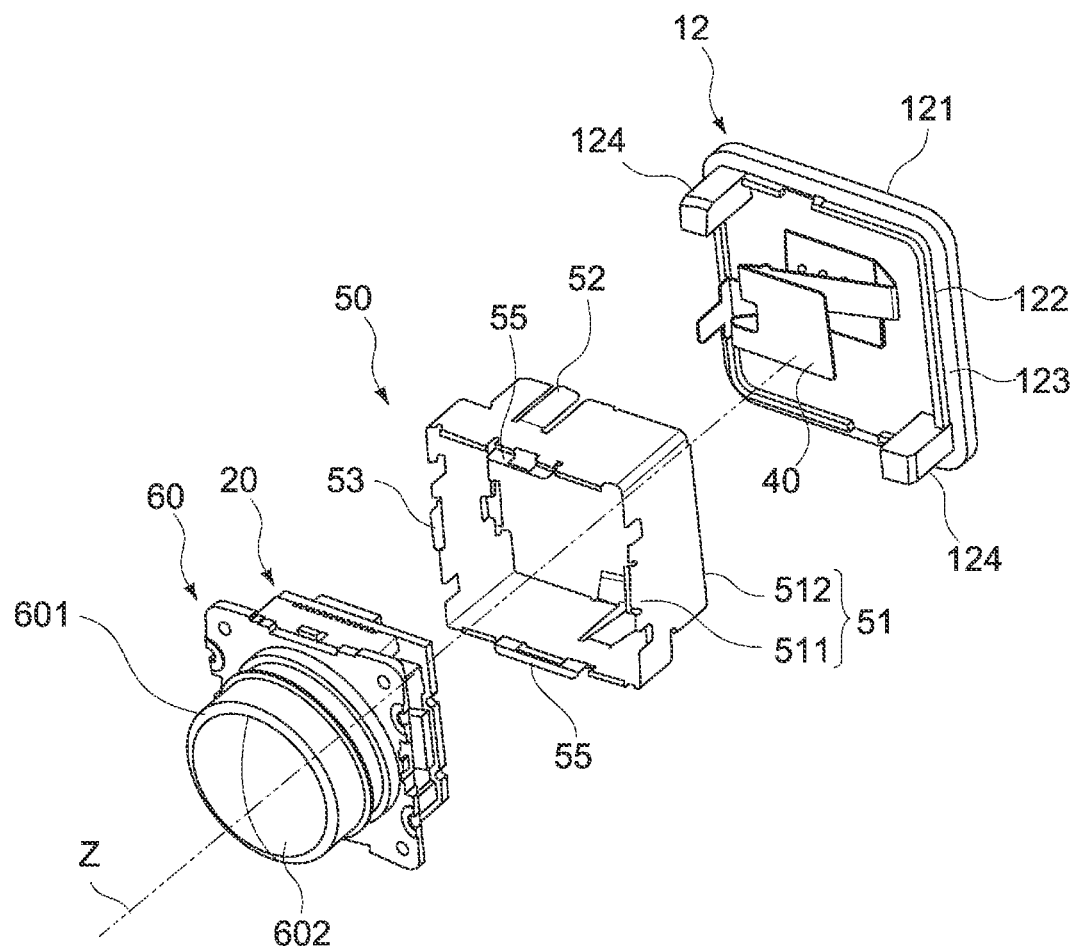
FIG. 3 is an exploded perspective view illustrating a relationship between the barrel member, a support, and a second case in the camera module.
Figure 4:
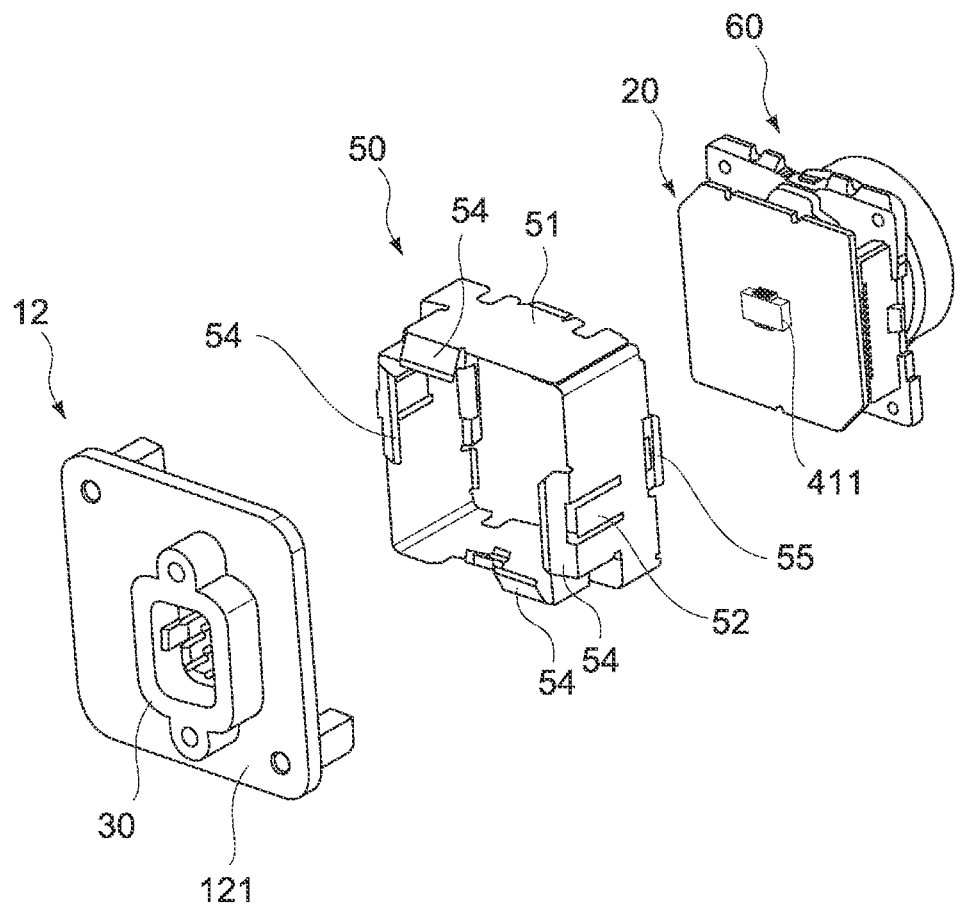
FIG. 4 is an exploded perspective view illustrating a relationship between the barrel member, the support, and the second case in the camera module.

FIG. 2 is an exploded perspective view illustrating a relationship between the front case 11 and the barrel member 60, and FIGS. 3 and 4 are exploded perspective views illustrating a relationship between the barrel member 60, the support 50, and the rear case 12.

The front case 11 includes a front surface portion 111 that is formed substantially orthogonal to the direction of the optical axis Z, and a lateral surface portion 112 that extends toward the rear case 12 from a peripheral edge of the front surface portion 111. In the present embodiment, the front surface portion 111 is substantially rectangular as viewed from the direction of the optical axis Z. The front case 11 is hollow, and a space portion that accommodates therein, for example, the sensor board 20, the support 50, and the barrel member 60 is formed in a region surrounded by the front surface portion 111 and the lateral surface portion 112.

The front case 11 includes an opening 113 at one of its ends, and an opening end 114 at another of its ends that is situated opposite to the one of its ends. The opening 113 is formed in a middle portion of the front surface portion 111. The opening end 114 is formed at an end of the lateral surface portion 112 that is situated on the side of the rear case 12. The opening end 114 is formed to be substantially rectangular correspondingly to an outer shape of the front surface portion 111. Note that the front surface portion 111 and the opening end 114 are not limited to being rectangular, and may be formed into another shape, such as a circular shape or a triangular shape.

The rear case 12 includes a bottom surface portion 121 that is formed substantially orthogonal to the direction of the optical axis Z. The bottom surface portion 121 is formed into a generally rectangular plate shape. A substantially rectangular annular rib 122 is formed along a peripheral edge of the bottom surface portion 121. The annular rib 122 is provided near a peripheral edge of an inner surface (a surface that faces the front case 11) of the bottom surface portion 121. The annular rib 122 is fitted into an inner peripheral edge of the opening end 114, and partitions the peripheral edge of the inner surface of the bottom surface portion 121 to form a joining surface 123 that is joined to the opening end 114 of the front case 11. The front case 11 and the rear case 12 are integrated with each other by the joining surface 123 being welded to the opening end 114. A positioning protrusion 124 that is fitted into the opening end 114 is provided to each of two corners of the bottom surface portion 121 that are situated diagonal to each other.

In the present embodiment, the joining surface 123 is joined to the opening end 114 using laser welding. The front case 11 is made of a synthetic resin material that has absorptive properties with respect to laser light used for welding, and the rear case 12 is made of a synthetic resin material that has transmissive properties with respect to the laser light.

For example, a general-purpose resin such as an acrylonitrile-styrene (AS) resin or an acrylonitrile-butadiene-styrene (ABS) resin, a polycarbonate (PC) resin, a mixture resin of ABS and PC, a polyamide (PA) resin, or a polybutylene terephthalate (PBT) resin is used as a resin material that has absorptive properties or transmissive properties with respect to laser light.

The absorptive properties or the transmissive properties with respect to laser light can be adjusted by, for example, an amount of a laser-absorptive material that is mixed with a resin. For example, carbon black can be used as the laser-absorptive material. The adjustment of an amount of the laser-absorptive material added makes it possible to adjust the laser-light absorptance (or the laser-light transmittance) discretionarily. Note that it is favorable that the same type of matrix resin be used for a resin material having absorptive properties with respect to laser light and a resin material having transmissive properties with respect to the laser light. This results in increasing an affinity between resins situated at a joining portion and in enhancing the weld strength. Further, a change in a thickness of a resin makes it possible to adjust the transmittance. When the thickness of a resin is made larger (when a resin is made thicker), this makes it possible to further decrease the transmittance of the resin. Further, when the thickness of a resin is made smaller (when a resin is made thinner), this makes it possible to further increase the transmittance of the resin.

In the present embodiment, for example, red laser light or infrared laser light of a wavelength of from 800 nm to 1100 nm is used as laser light used for welding. With respect to a resin material having transmissive properties with respect to laser light, the transmittance of the resin material with respect to the laser light is greater than or equal to 30%, and favorably greater than or equal to 40%.

(Barrel Member)

Figure 5:
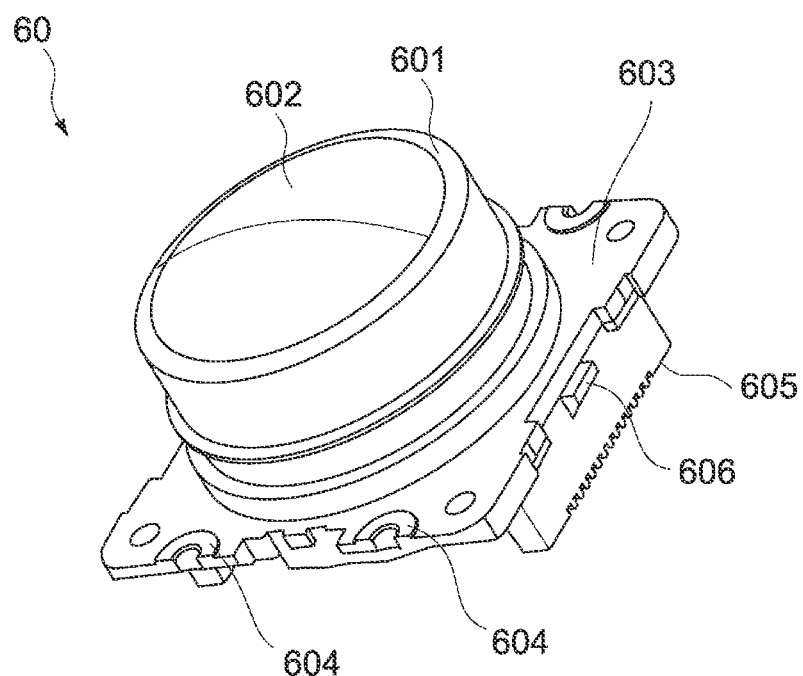
FIG. 5 is a perspective view of the barrel member.
Figure 6:
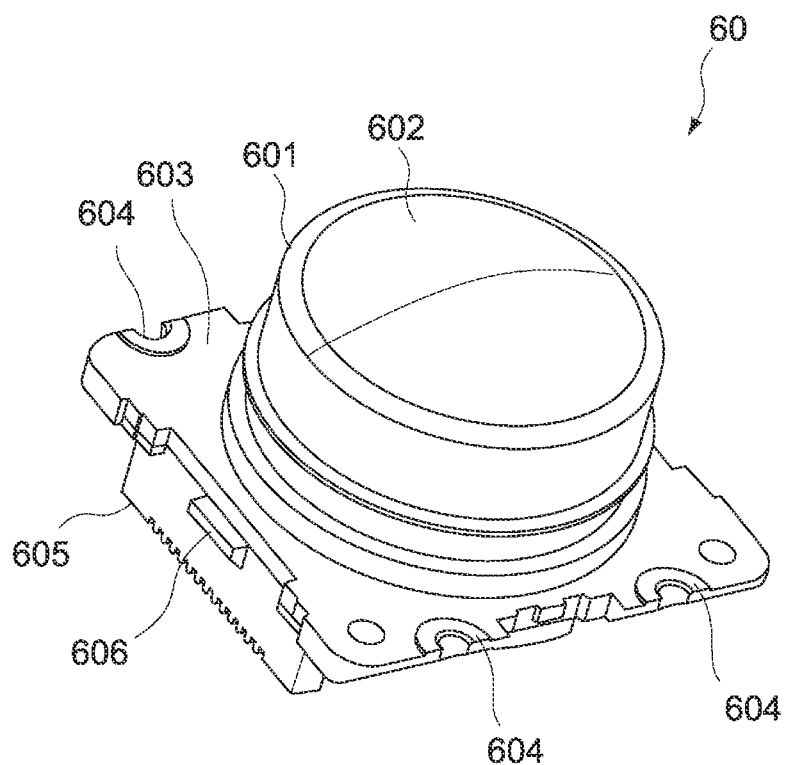
FIG. 6 is a perspective view of the barrel member.
Figure 7:
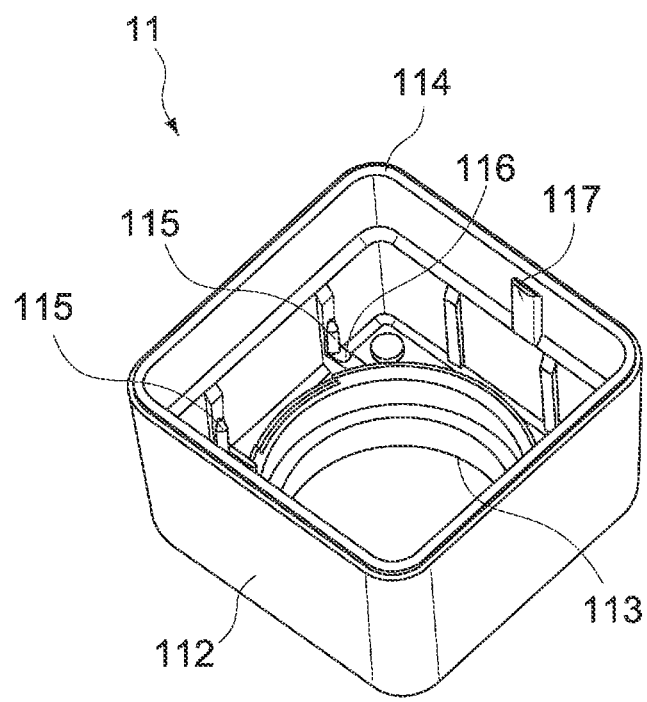
FIG. 7 is a perspective view illustrating a configuration of the inside of the first case.

FIGS. 5 and 6 are perspective views of the barrel member 60. FIG. 7 is a perspective view illustrating a configuration of the inside of the front case 11.

The barrel member 60 is arranged in the front case 11. The barrel member 60 includes a barrel 601 that is made of a synthetic resin and fitted into the opening 113 through a seal ring 62 (refer to FIGS. 1 and 2) in the direction of the optical axis Z. The barrel 601 is a cylindrical portion that supports an imaging lens 602, and protrudes forward of the front case 11 from the opening 113. A plurality of lenses is arranged in the barrel 601, although this is not illustrated.

The barrel member 60 further includes a substantially rectangular flange 603 that protrudes radially outward from the barrel 601. A plurality of reference surfaces 604 that is brought into contact with an inner surface of the front surface portion 111 of the front case 11 is provided to a surface of the flange 603 that faces the front surface portion 111 of the front case 11. Each of the reference surfaces 604 is a convex portion having an arc shape, where two facing sides of the flange 603 are each provided with two reference surfaces 604.

Four reference pins 115 in total are respectively provided to positions, on the inner surface of the front surface portion 111 of the front case 11, that correspond to the respective reference surfaces 604 (refer to FIG. 7). The reference pins 115 are inserted into the respective reference surfaces 604 of the barrel member 60 to control misalignment of the barrel member 60 in the front case 11. Further, a pedestal 116 that is brought into contact with a corresponding reference surface 604 of the barrel member 60 is provided to the inner surface of the front case 11 between a corresponding reference pin 115 and the opening 113. The reference surface 604 and the pedestal 116 are brought into contact with each other to determine a position of the barrel member 60 with respect to the front case 11 such that the barrel member 60 is in a pose in which the flange 603 is orthogonal to the direction of the optical axis Z.

The barrel member 60 further includes a pair of leg portions 605 joined to the sensor board 20. As illustrated in FIGS. 5 and 6, leg portions 605 of the pair of leg portions 605 are plate walls that each extend in a direction vertical to the flange 603 (the direction of the optical axis Z). In the present embodiment, the leg portions 605 are provided parallel to two facing sides of the flange 603 such that an imaging device 22 of the sensor board 20 is situated between the leg portions 605 (refer to FIG. 1). Ends of the pair of leg portions 605 are fixed to the sensor board 20 through a joining member 63 such as an adhesive.

(Sensor Board)

The sensor board 20 is arranged in the housing 10. The sensor board 20 includes a board body 21 that faces the barrel 601, and the imaging device 22 mounted on a front surface of the board body 21 facing the barrel 601.

The board body 21 is a rigid double-sided circuit board (a circuit board in which an electric circuit is formed on both a front surface and a back surface of the circuit board) such as a glass epoxy board. The board body 21 is not limited to being a single board as illustrated in the figures, and may be a board unit that includes a front board that faces the front surface portion 111 of the front case 11, a rear board that faces the bottom surface portion 121 of the rear case 12, and a spacer that is arranged between the front board and the rear board.

The imaging device 22 is an image sensor such as a complementary metal-oxide semiconductor (CMOS) image sensor or a charge coupled device (CCD) image sensor. The imaging device 22 is arranged to face the barrel 601, and includes an imaging surface at a height that corresponds to a focal position of the imaging lens 602. As described above, the board body 21 is fixed to the pair of leg portions 605 of the barrel member 60 through the joining member 63 (refer to FIG. 1).

Through a flexible printed circuit 40, the board body 21 is electrically connected to an external connector 30 that is provided to the rear case 12. The external connector 30 is used to electrically connect the sensor board 20 and a vehicle body. Through the external connector 30, power is supplied from the vehicle body to the sensor board 20, and an image signal (an output signal of the imaging device 22) is transmitted from the sensor board 20 to the vehicle body.

(External Connector and Flexible Printed Circuit)

Figure 8:
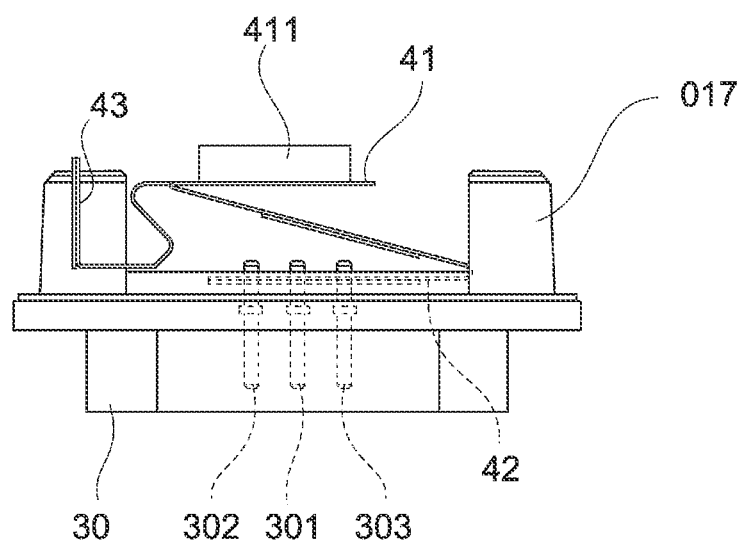
FIG. 8 is a side view of the second case.
Figure 9:
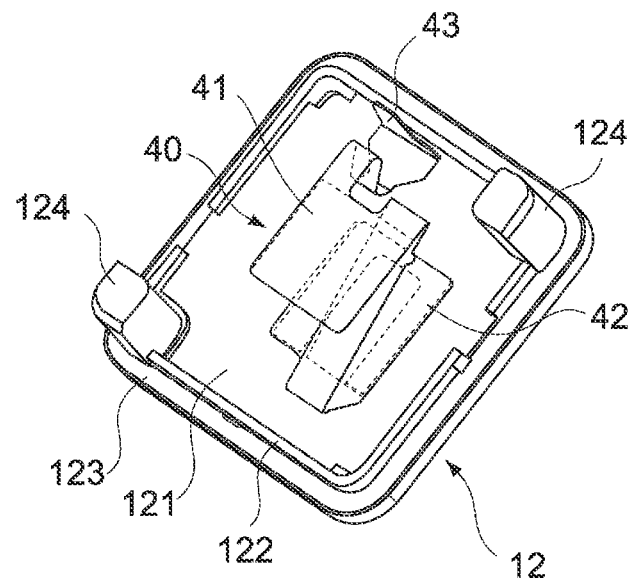
FIG. 9 is a perspective view of the second case.

FIG. 8 is a side view of the rear case 12 that illustrates a relationship between the rear case 12 and the external connector 30, and FIG. 9 is a perspective view of the rear case 12 that illustrates a configuration of the flexible printed circuit 40.

As illustrated in FIG. 8, the external connector 30 includes a first connection pin 301, a second connection pin 302, and a third connection pin 303 that are respectively provided to the bottom surface portion 121 of the rear case 12. The first connection pin 301 passes through the bottom surface portion 121 of the rear case 12, and is connected to an end of a signal terminal of a coaxial cable. The second connection pin 302 and the third connection pin 303 pass through the bottom surface portion 121 of the rear case 12, and are connected to an end of a shield terminal of the coaxial cable.

The flexible printed circuit 40 electrically connects the sensor board 20 and the external connector 30. The flexible printed circuit 40 is a circuit board obtained by routing a signal line and a ground line on a flexible base material such as polyimide. The signal line is wiring that carries an image signal coming from the sensor board 20, and the ground line is wiring that is connected to a ground line of the sensor board 20. When the sensor board 20 and the external connector 30 are connected to each other using the flexible printed circuit 40, this makes it possible to absorb variations (tolerances) in a distance between the sensor board 20 and the external connector 30, and thus to ensure the reliability in a stable electrical connection between them.

The flexible printed circuit 40 includes a first base-material end 41 that is connected to the sensor board 20 (the board body 21), a second base-material end 42 that is connected to the external connector 30, and a third base-material end 43 that is connected to the support 50. The first base-material end 41 is connected to the sensor board 20 through an internal connector 411. The second base-material end 42 is connected to the external connector 30 using soldering. Further, the third base-material end 43 is connected to the support 50 through, for example, a conductive lock member (not illustrated). The third base-material end 41 includes a wiring layer that electrically connects the support 50 to the second and third connection pins 302 and 303.

(Support)

Figure 10:
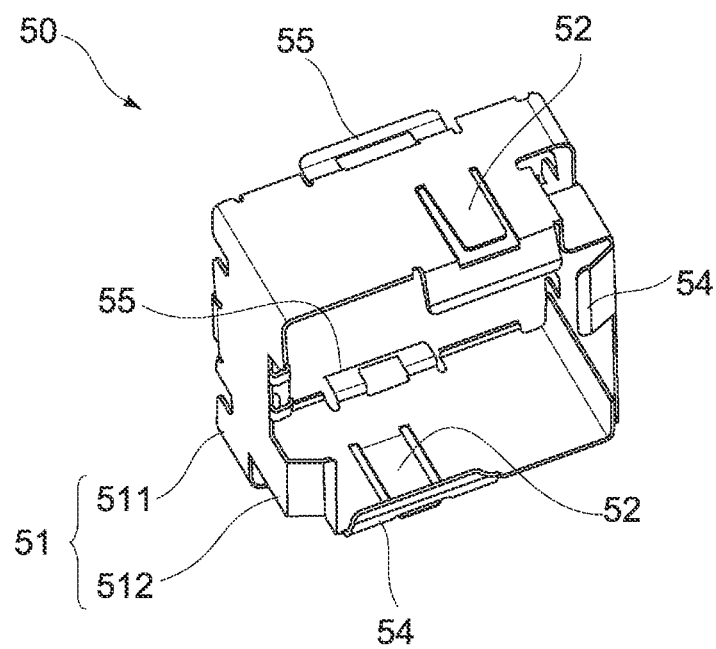
FIG. 10 is a perspective view illustrating a configuration of the support.
Figure 11:
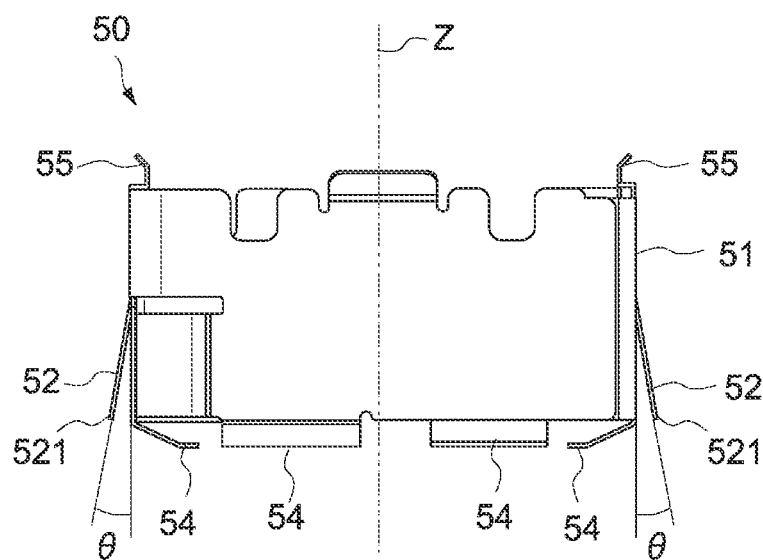
FIG. 11 is a side view of the support.

FIG. 10 is a perspective view illustrating a configuration of the support 50, and FIG. 11 is a side view of the support 50. The support 50 is described in detail below with reference to FIGS. 3, 4, 10, and 11.

The support 50 is a substantially rectangular cylindrical body. The support 50 is typically made of a metallic material such as stainless steel, an aluminum alloy, or a copper alloy, and is a shield case or a chassis that is one of components used for electromagnetic compatibility (EMC) measures taken to protect the sensor board 20 from electromagnetic noise. The support 50 is a press-molded body of a sheet metal made of the metallic material described above.

The support 50 is arranged in the front case 11 to be situated between the barrel member 60 and the rear case 12. The support 50 includes a peripheral wall portion 51 and a control portion 52.

The peripheral wall portion 51 includes four lateral surfaces that cover around the sensor board 20 including the imaging device 22. The peripheral wall portion 51 includes two ends that are a first end 511 and a second end 512 that face each other in the direction of the optical axis Z. The first end 511 supports the barrel member 60. The second end 512 includes an elastic portion 54 that is brought into elastic contact with the rear case 12.

An engagement part 55 that is engaged with the barrel member 60 is provided to the first end 511 of the peripheral wall portion 51. An engagement protrusion 606 (refer to FIGS. 5 and 6) is provided to an outer lateral surface of each of the pair of leg portions 605 of the barrel member 60. The engagement part 55 includes an engagement hole that is engaged with the engagement protrusion 606. The engagement part 55 is provided to each of two facing sides of the first end 511 (refer to FIG. 3).

The elastic portion 54 is formed by the second end 512 of the peripheral wall portion 51 being bent inward of the peripheral wall portion 51 at a specified angle. The elastic portion 54 is provided to a plurality of locations at the second end 512 of the peripheral wall portion 51. The elastic portion 54 is elastically deformed toward the front case 11 when the support 50 is accommodated in the housing 10, and biases the barrel member 60 toward the front surface portion 111 of the front case 11 using a reaction to the elastic force.

The control portion 52 is arranged between the peripheral wall portion 51 and an inner peripheral surface of the front case 11, and is used to control approach of the barrel member 60 and the peripheral wall portion 51 to the rear case 12. As illustrated in FIG. 11, the control portion 52 is an elastic part that is formed by cutting a portion of the peripheral wall portion 51 and pulling the cut portion outward, and that presses the inner peripheral surface of the front case 11. As illustrated in FIG. 11, this elastic part is a plate member that extends toward the rear case 12 from a substantially middle position in a height direction of the peripheral wall portion 51, and that is inclined at a specified angle (θ) with respect to the direction of the optical axis Z. The angle θ is set to be an angle at which an end 521 of the control portion 52 can press the inner peripheral surface of the front case 11 with a specified elastic force when the support 50 is accommodated in the front case 11. Note that this elastic force can also be adjusted by, for example, a length or a thickness of the elastic part, which forms the control portion 52.

The control portion 52 is provided to locations that are included in a plurality of locations in the peripheral wall portion 51 and situated across the sensor board 20 from each other. In the present embodiment, the control portion 52 is formed in each of two facing lateral surfaces of the peripheral wall portion 51. This makes it possible to stably hold the support 50 in the housing 10. The number of control portions 52 formed in each of the lateral surfaces is not limited to one, and two or more control portions 52 may be provided to respective locations in each of the lateral surfaces.

Figure 12:
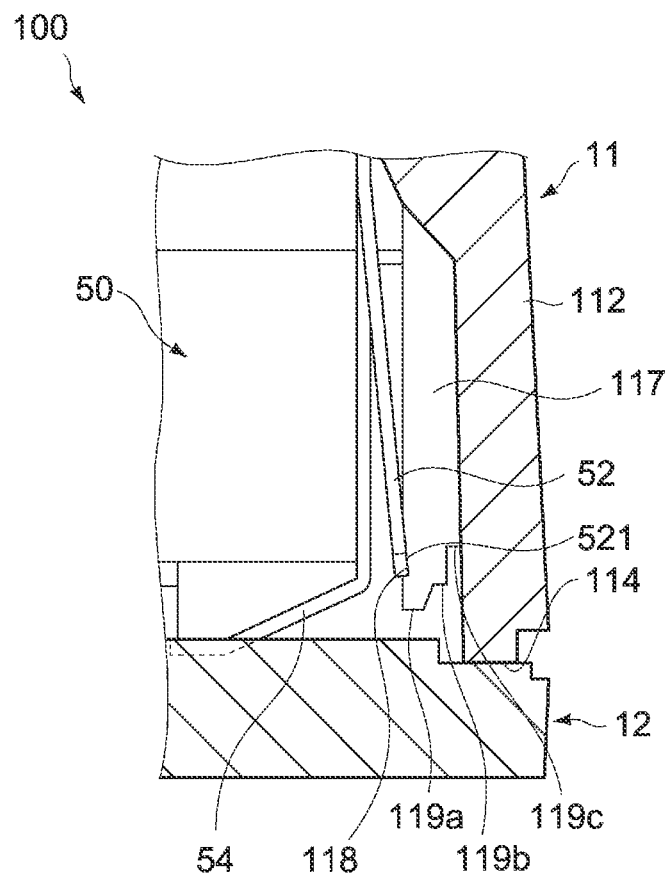
FIG. 12 is a cross-sectional view of a primary portion of the camera module that illustrates an engagement position for a control portion of the support and the first case.

FIG. 12 is a cross-sectional view of a primary portion of the camera module 100 that illustrates an engagement position for the control portion 52 of the support 50 and the front case 11. As illustrated in FIG. 12, the inner peripheral surface of the front case 11 includes an engagement concave portion 118 that is engaged with the end of the control portion 52. The engagement concave portion 118 is locally provided to the surface of an elongated protrusion 117 that is formed in the inner peripheral surface of the front case 11.

Figure 13:
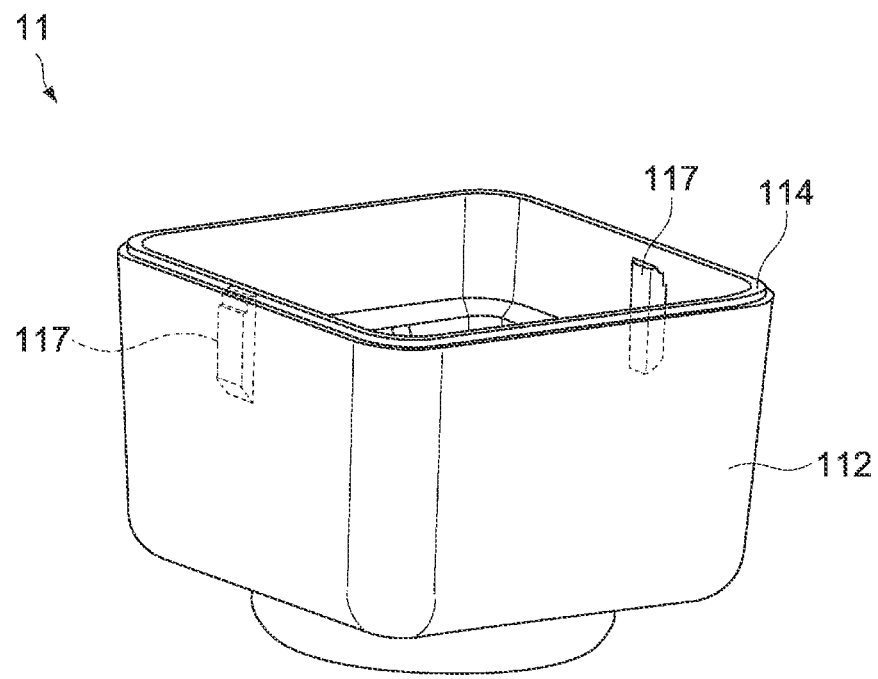
FIG. 13 is a perspective view of the first case.
Figure 14:
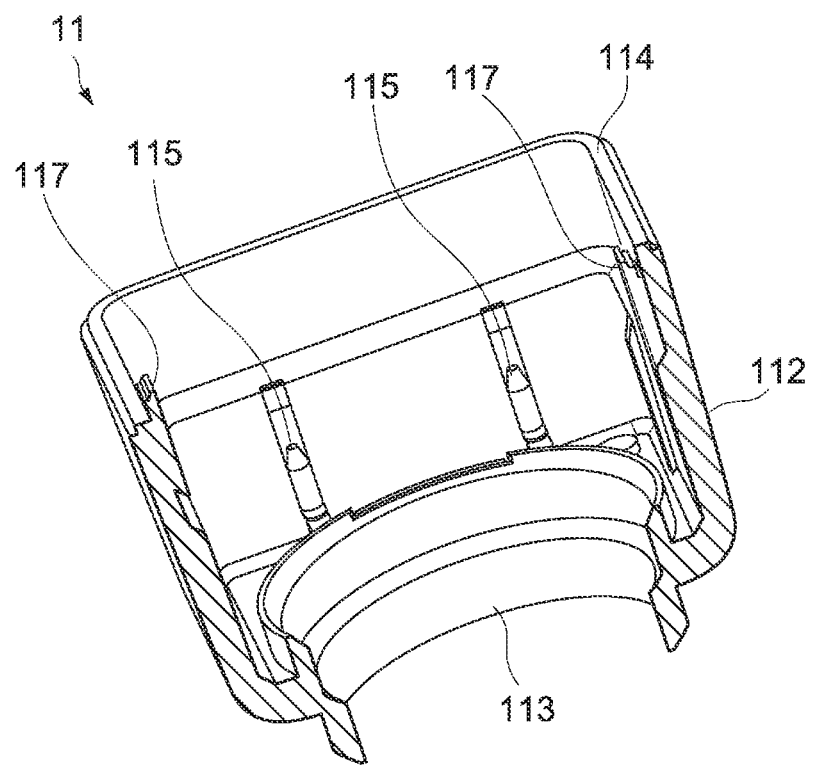
FIG. 14 is a cross-sectional perspective view of the first case.
Figure 15:
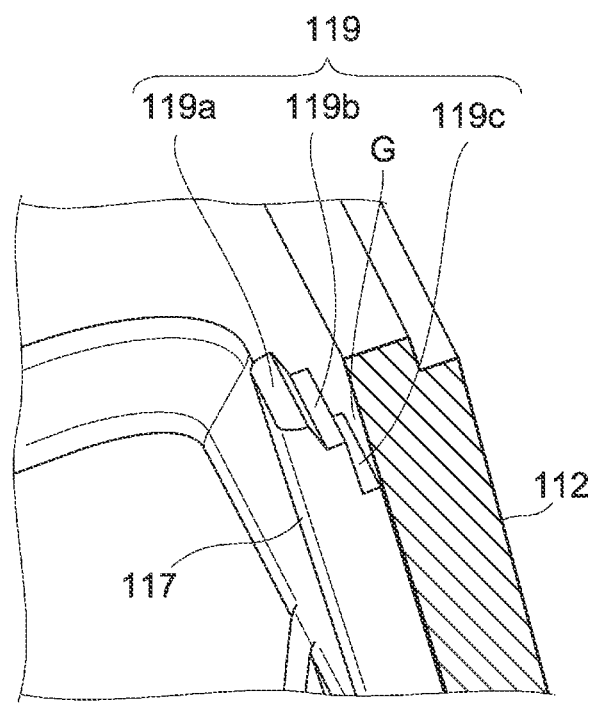
FIG. 15 is an enlarged view of a primary portion of the first case of FIG. 14.

FIG. 13 is a perspective view of the front case 11 that illustrates a configuration of the elongated protrusion 117, FIG. 14 is a cross-sectional perspective view of the front case 11, and FIG. 15 is an enlarged view of a primary portion of the front case 11 of FIG. 14.

As illustrated in FIG. 13, the elongated protrusion 117 is provided to each of inner surfaces of two facing lateral surfaces of the lateral surface portion 112 of the front case 11. The elongated protrusion 117 is a thick portion that is provided near the opening end 114 of the front case 11, has a specified width, and linearly extends toward the opening end 114.

A tip 119 of the elongated protrusion 117 faces the rear case 12 such that there is a gap between the tip 119 and the rear case 12 (refer to FIG. 12). As illustrated in FIG. 15, the tip 119 of the elongated protrusion 117 includes a first end surface 119a, a second end surface 119b, and a third end surface 119c. The first end surface 119a protrudes further toward the rear case 12 than the second end surface 119b, and the second end surface 119b protrudes further toward the rear case 12 than the third end surface 119c. The third end surface 119c corresponds to a bottom of a gap portion (groove) G that is formed between the second end surface 119b and the lateral surface portion 112 of the front case 11.

The second end surface 119b is a light entrance surface that laser light L2 (refer to FIG. 18) used to form the engagement concave portion 118 enters, as described later.

The second end surface 119b is formed at a height that is similar to the height of the end 521 of the control portion 52 (refer to FIG. 12).

As described later, the elongated protrusion 117 receives irradiation of laser light used for welding that is used to join the front case 11 and the rear case 12, and a portion of the elongated protrusion 117 that is brought into contact with the end 521 of the control portion 52 is softened to form the engagement concave portion 118. A width, a length, and a thickness of the elongated protrusion 117 are not particularly limited as long as the elongated protrusion 117 has a shape with which the engagement concave portion 118 can be formed by the method described above. The elongated protrusion 117 is formed at a plurality of locations in the inner surface of the front case 11, each of the plurality of locations being brought into contact with the control portion 52.

[Method for Producing Camera Module]

Next, a method for producing the camera module 100 of the present embodiment, which has the configuration described above, is described.

The method for producing the camera module 100 according to the present embodiment includes accommodating the sensor board 20, the barrel member 60, and the support 50 in the front case 11, connecting the sensor board 20 and the external connector 30 using the flexible printed circuit 40, connecting the support 50 and the external connector 30 using the flexible printed circuit 40, and welding the front case 11 and the rear case 12 to form the housing 10.

The support 50 is accommodated in the housing 10 in a state in which the engagement part 55 situated on the side of the first end 511 of the support 50 is engaged with the engagement protrusion 606 of the barrel member 60. When the support 50 is accommodated in the front case 11, the control portion 52 protruding outward from the peripheral wall portion 51 is elastically deformed inward of the peripheral wall portion 51 by a specified amount. When the rear case 12 is jointed to the front case 11, the joining surface 123 of the rear case 12 is brought into contact with the opening end 114 of the front case 11 in a state in which the rear case 12 is pressed against the front case 11 under a specified load.

In this state, in the support 50 accommodated in the housing 10, the elastic portion 54 on the side of the second end 512 is elastically deformed by being brought into contact with the bottom surface portion 121 of the rear case 12. Consequently, each reference surface 604 (refer to FIGS. 5 and 6) of the barrel member 60 is brought into contact with a corresponding pedestal 116 of the front case 11 to determine a position of the barrel member 60 with respect to the front case 11.

Figure 16:
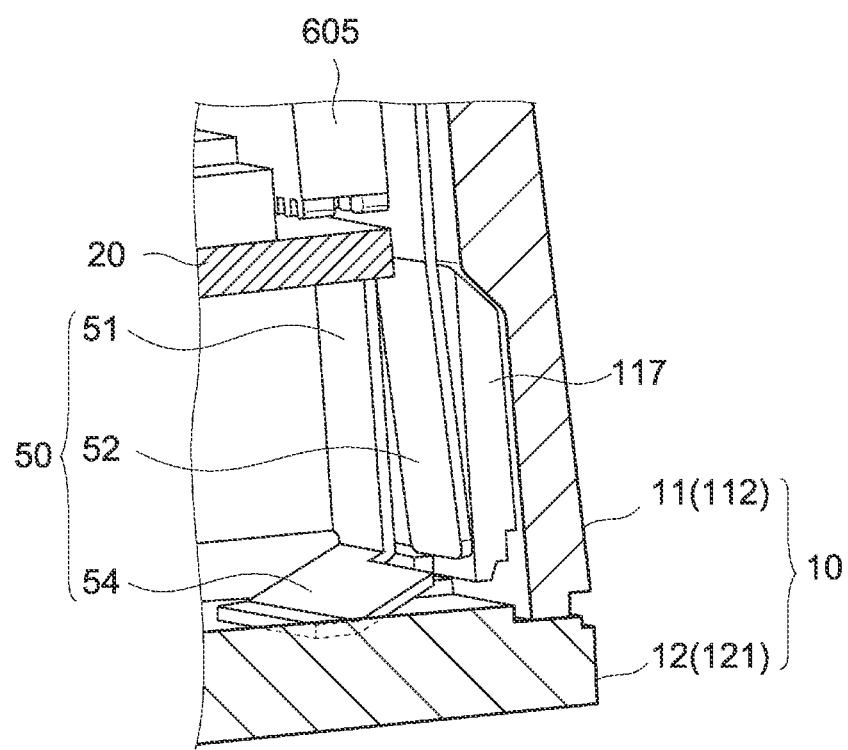
FIG. 16 is a cross-sectional perspective view of a primary portion of the camera module.

Further, in this state, the control portion 52 of the support 50 is brought into close contact with the inner surface (the elongated protrusion 117) of the front case 11 due to an elastic force that corresponds to the amount of deformation of the control portion 52 when the support 50 is accommodated in the front case 11. FIG. 16 is a cross-sectional perspective view of a primary portion of the inside of the housing 10 in that state.

Figure 17:
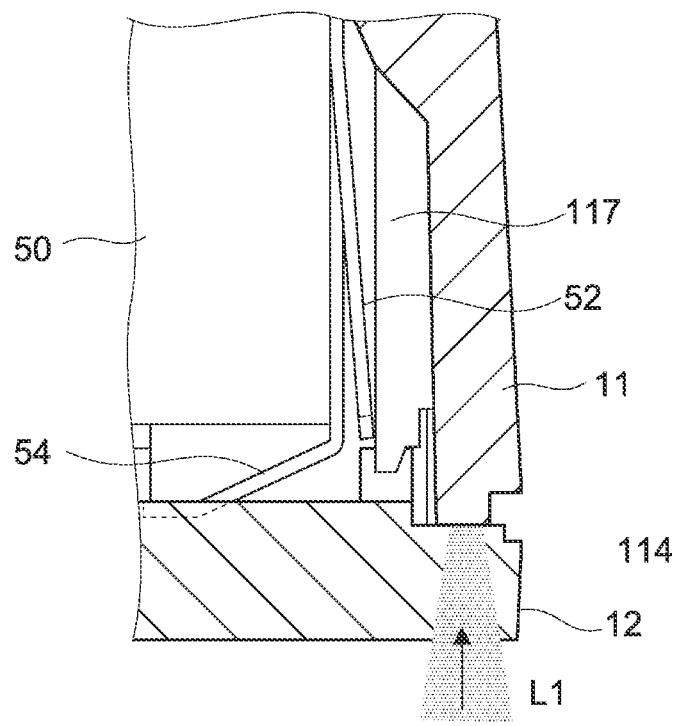
FIG. 17 is a cross-sectional side view of a primary portion of the camera module that is used to describe welding the first case and the second case.

Subsequently, laser light L1 is irradiated onto the rear case 12 toward the opening end 114 in a state in which the rear case 12 is pressed against the front case 11 under a specified load, as illustrated in FIG. 17. The front case 11 is made of a resin material that has absorptive properties with respect to the laser light L1, and the rear case 12 is made of a resin material that has transmissive properties with respect to the laser light L1. Thus, the laser light L1 is transmitted through the rear case 12 to be irradiated onto the opening end 114 of the front case 11. The laser light L1 is rectangularly annularly scanned along the opening end 114. The laser light L1 may be a continuous wave or a pulsed wave.

A region, in the opening end 114, that is irradiated with the laser light L1 generates heat due to absorption of the laser light L1 to be partially melted. The joining surface 123 facing the opening end 114 is also partially melted due to heat transfer from a melted portion of the opening end 114. Thereafter, the melted portion of the opening end 114 and a melted portion of the joining surface 123 are cooled to be solidified, and the front case 11 and the rear case 12 are welded to each other. Since the laser light L1 is continuously scanned circumferentially along the rectangularly annular opening end 114, welding is performed on an all-around region of the opening end 114. This results in securing sealing properties of joining surfaces of the front case 11 and the rear case 12.

Figure 18:
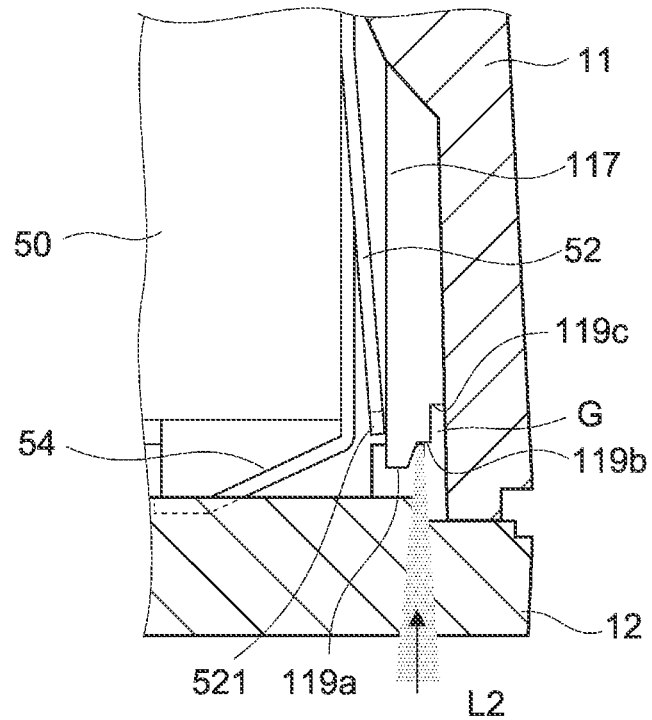
FIG. 18 is a cross-sectional side view of a primary portion of the camera module that is used to describe forming an engagement concave portion engaged with the control portion of the support.

Subsequently, the laser light L2 is irradiated onto the rear case 12 toward the second end surface 119b of the elongated protrusion 117, as illustrated in FIG. 18. The same laser light as the laser light L1 can be used as the laser light L2, and a spot diameter is adjusted as appropriate according to the size of the second end surface 119b. Further, the second laser light L2 may be irradiated with an irradiation power lower than an irradiation power of the laser light L1 since it is sufficient if the elongated protrusion 117 can be partially softened.

The laser light L2 is transmitted through the rear case 12 to be irradiated onto the second end surface 119b of the elongated protrusion 117. The second end surface 119b and a region, in the elongated protrusion 117, that is situated around the second end surface 119b generate heat due to absorption of the laser light L2 to be partially softened. In the present embodiment, the gap portion G used to form the third end surface 119c is formed between the second end surface 119b and the lateral surface portion 112 of the front case 11. This gap portion G makes it possible to prevent a heat generated due to the laser light L2 being absorbed by the second end surface 119b from being transferred to the lateral surface portion 112. This results in being able to prevent the lateral surface portion 112 from being thermally deformed.

On the other hand, the elongated protrusion 117 is subjected to a pressing load from the control portion 52 of the support 50. Thus, a portion, in the elongated protrusion 117, that is brought into contact with the control portion 52 is caved in due to the elongated protrusion 117 being softened. Thereafter, the second end surface 119b is cooled to be solidified. Accordingly, the engagement concave portion 118 engaged with the end 521 of the control portion 52 is formed on the surface of the elongated protrusion 117.

In the camera module 100 of the present embodiment, which is produced as described above, the engagement concave portion 118 engaged with the control portion 52 of the support 50 is formed in the inner surface of the front case 11 in a state in which the support 50 is incorporated into the housing 10. This makes it possible to keep the barrel member 60 pressed toward the front surface portion 111 of the front case 11. Consequently, after the formation of the engagement concave portion 118, the reference surface 604 of the barrel member 60 is held in a reference position in which the reference surface 604 is in contact with the pedestal 116 of the front case 11. This results in being able to stably determine a position of the barrel member 60 without causing a wobble of the barrel member 60 in the housing 10 in the direction of the optical axis.

In the camera module 100 of the present embodiment, when an external force that causes the barrel member 60 protruding from the opening 113 of the front case 11 to be pressed toward the rear case 12 acts, the barrel member 60 sinks toward the rear case 12 by a specified amount, with the elastic portion 54 and control portion 52 provided to the second end 512 of the support 50 being elastically deformed. However, an effect of engagement of the control portion 52 of the support 50 with the engagement concave portion 118 of the elongated protrusion 117 of the front case 11 prevents the barrel member 60 from sinking beyond the specified amount. This results in preventing the elastic portion 54 from being deformed beyond its elastic limit. Consequently, after cancellation of the external force, the barrel member 60 can be stably returned to the original reference position using elastic forces of the control portion 52 and the elastic portion 54.

Thus, the present embodiment makes it possible to prevent the support 50 from being deformed beyond its elastic limit. This results in being able to prevent a reduction in the accuracy in the position of the barrel member 60 in the housing 10. This makes it possible to improve the durability for an external force that acts on the barrel 601, and thus to prevent a reduction in the quality of a camera image.

<Modifications>

In the embodiments described above, laser welding is used to join the front case 11 and the rear case 12. Without being limited thereto, ultrasonic welding may be used.

Further, in the embodiments described above, the control portion 52 of the support 50 is formed into a plate that extends toward the rear case 12. Without being limited thereto, the control portion 52 may be, for example, a curved step portion that has an arc shape or a rectangular shape and protrudes from the peripheral wall portion 51 toward the inner surface of the front case 11.

Furthermore, in the embodiments described above, the front case 11 is made of a synthetic resin material that has absorptive properties with respect to laser light used for laser welding, and the rear case 12 is made of a synthetic resin material that has transmissive properties with respect to the laser light. Instead of this example, the front case 11 may be made of a synthetic resin material that has transmissive properties with respect to the laser light, and the rear case 12 may be made of a synthetic resin material that has absorptive properties with respect to the laser light.

Figure 19:
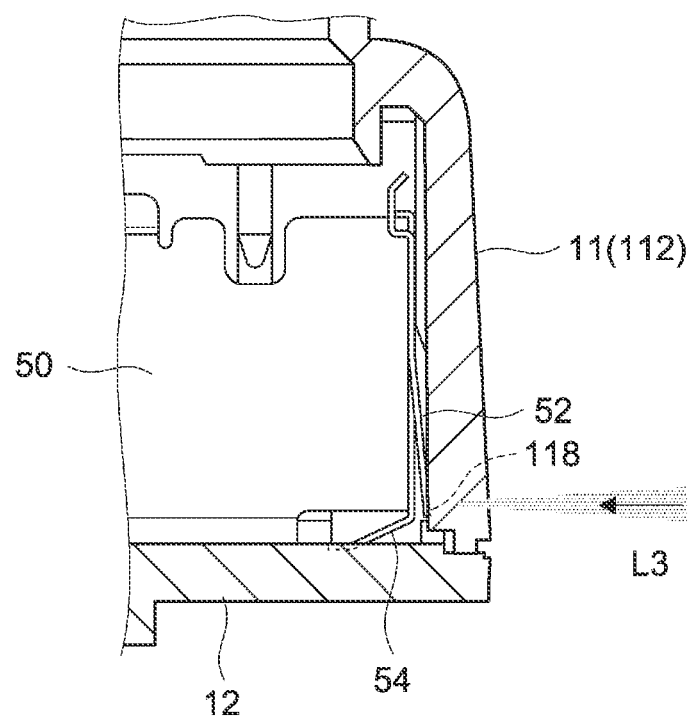
FIG. 19 is a cross-sectional side view of a primary portion of the camera module that is used to describe a modification of the example of FIG. 18.

In this case, for example, as illustrated in FIG. 19, laser light L3 may be irradiated onto the lateral surface portion 112 of the front case 11 toward the control portion 52 to partially soften a region, in the inner surface of the front case 11, that is brought into contact with the control portion 52, in order to form, in the front case 11, the engagement concave portion 118 engaged with the control portion 52 of the support 50.

Note that the present technology may also take the following configurations.

(1) A camera module, including:
a housing that includes a first case that includes an opening at one of ends of the first case, and a second case that is joined to another of the ends of the first case;
a barrel member that is arranged in the housing and includes a barrel that is fitted into the opening in an optical-axis direction;
a sensor board that is arranged in the housing and includes an imaging device that faces the barrel; and
a support that includes a peripheral wall portion and a control portion, and is arranged between the barrel member and the second case, the peripheral wall portion including a first end and a second end and covering around the imaging device, the first end being brought into elastic contact with the barrel member, the second end being brought into elastic contact with the second case, the control portion being arranged between the peripheral wall portion and an inner peripheral surface of the first case and controlling approach of the barrel member to the second case.

(2) The camera module according to (1), in which
the control portion is an elastic part that is formed of a portion of the peripheral wall portion and presses the inner peripheral surface of the first case.

(3) The camera module according to (2), in which
the elastic part is a plate member that extends toward the second case from the side of the barrel member and is inclined with respect to the optical-axis direction.

(4) The camera module according to (2) or (3), in which
the inner peripheral surface of the first case includes an engagement concave portion that is locally formed at a position, in the inner peripheral surface, that is brought into contact with the elastic part, the engagement concave portion being engaged with an end of the elastic part.

(5) The camera module according to (4), in which
the first case is made of a synthetic resin material that has absorptive properties with respect to laser light of a specified wavelength, and
the second case is made of a synthetic resin material that has transmissive properties with respect to the laser light.

(6) The camera module according to (5), in which
the first case further includes an elongated protrusion that is provided to the inner peripheral surface of the first case, the elongated protrusion including the engagement concave portion, and
the elongated protrusion includes a light entrance surface that faces the second case such that there is a gap between the light entrance surface and the second case, the light entrance surface being capable of receiving irradiation of the laser light.

(7) The camera module according to (6), in which
the elongated protrusion further includes a gap portion that is formed between the light entrance surface and a lateral surface portion of the first case.

(8) The camera module according to any one of (1) to (7), in which
the control portion is provided to locations that are included in a plurality of locations in the peripheral wall portion and situated across the sensor board from each other.

(9) The camera module according to any one of (1) to (8), further including
an external connector that is provided to the second case and electrically connected to the sensor board.

(10) The camera module according to any one of (1) to (9), in which
the camera module is attachable to a vehicle.

REFERENCE SIGNS LIST 10 housing
11 front case
12 rear case
20 sensor board 22 imaging device
30 external connector
40 flexible printed circuit
50 support
51 peripheral wall portion
52 control portion
54 elastic portion
60 barrel member
100 camera module
113 opening
114 opening end
117 elongated protrusion
118 engagement concave portion
123 joining surface

The invention claimed is:

1. A camera module, comprising:
a housing that includes a first case that includes an opening at one of ends of the first case, and a second case that is joined to another of the ends of the first case;
a barrel member that is arranged in the housing and includes a barrel that is fitted into the opening in an optical-axis direction;
a sensor board that is arranged in the housing and includes an imaging device that faces the barrel; and
a support that includes a peripheral wall portion and a control portion, and is arranged between the barrel member and the second case, the peripheral wall portion including a first end and a second end and covering around the imaging device, the first end supporting the barrel member, the second end being brought into elastic contact with the second case, the control portion being arranged between the peripheral wall portion and an inner peripheral surface of the first case and controlling approach of the barrel member to the second case.

2. The camera module according to claim 1, wherein the control portion is an elastic part that is formed of a portion of the peripheral wall portion and presses the inner peripheral surface of the first case.

3. The camera module according to claim 2, wherein the elastic part is a plate member that extends toward the second case from the peripheral wall portion and is inclined with respect to the optical-axis direction.

4. The camera module according to claim 2, wherein the inner peripheral surface of the first case includes an engagement concave portion that is locally formed at a position, in the inner peripheral surface, that is brought into contact with the elastic part, the engagement concave portion being engaged with an end of the elastic part.

5. The camera module according to claim 4, wherein the first case is made of a synthetic resin material that has absorptive properties with respect to laser light of a specified wavelength, and
the second case is made of a synthetic resin material that has transmissive properties with respect to the laser light.

6. The camera module according to claim 5, wherein the first case further includes an elongated protrusion that is provided to the inner peripheral surface of the first case, the elongated protrusion including the engagement concave portion, and
the elongated protrusion includes a light entrance surface that faces the second case such that there is a gap between the light entrance surface and the second case, the light entrance surface being capable of receiving irradiation of the laser light.

7. The camera module according to claim 6, wherein the elongated protrusion further includes a gap portion that is formed between the light entrance surface and a lateral surface portion of the first case.

8. The camera module according to claim 1, wherein the control portion is provided to locations that are included in a plurality of locations in the peripheral wall portion and situated across the sensor board from each other.

9. The camera module according to claim 1, further comprising
an external connector that is provided to the second case and electrically connected to the sensor board.

10. The camera module according to claim 1, wherein the camera module is attachable to a vehicle.

* * * * *